April 19, 1966        B. C. HOLBEN        3,246,496

SHAFT DISPLACEMENT TRANSDUCER

Filed Feb. 27, 1963        3 Sheets-Sheet 1

Inventor
Bernard C. Holben
By G. Henry Peterson
AGENT

April 19, 1966   B. C. HOLBEN   3,246,496
SHAFT DISPLACEMENT TRANSDUCER
Filed Feb. 27, 1963   3 Sheets-Sheet 2

Inventor
Bernard C. Holben
by G. Henry Peterson
AGENT

United States Patent Office 3,246,496
Patented Apr. 19, 1966

3,246,496
SHAFT DISPLACEMENT TRANSDUCER
Bernard C. Holben, Dublin, Ohio, assignor to Industrial Nucleonics Corporation, a corporation of Ohio
Filed Feb. 27, 1963, Ser. No. 261,418
11 Claims. (Cl. 72—21)

This invention relates to an automatic positioning control system of the discontinuous reset type which provides impulse corrections proportional to an error signal, and more particularly it relates to an arrangement for applying a transducer to the machine to be controlled whereby the transducer is able to provide a feedback signal representing the amount of adjustment to the control member effected by the controller during each impulse correction.

The invention is herein illustrated and described as being embodied in an apparatus for controlling the screwdown of calenders or rolling mills, and constitutes an improvement to the control system described and claimed in a copending application (now abandoned) Serial No. 261,406, filed February 27, 1963 by William H. Palmer and Frank M. Alexander. In said application there is disclosed a controller which is operative in response to an error signal to energize the screwdown adjusting motor in a direction to correct a deviation in the thickness of a sheet or strip issuing from a calender or rolling mill. This controller is characterized by means for generating a feedback signal which starts from zero when the screwdown adjusting motor is first energized, and as the adjustment proceeds, the feedback signal increases proportionally with the amount of adjustment to the screwdown which has been effected by operation of the screw down motor.

The feedback signal is returned to the controller, wherein it is continuously compared with the value of the error signal which is energizing the controller. When the value of the feedback signal becomes equal and opposite to the error signal, the correction to the screwdown is terminated. The controller remains inactivated for a period of time at least long enough to allow material processed with the new screwdown setting to travel from the calender to the location of a gauge measuring the thickness of the output strip. During the time that the controller is so inactivated, the feedback signal is reset to zero, so that when each subsequent correction to the screwdown is initiated, the feedback signal will have zero value regardless of the particular setting of the screwdown adjustment which has resulted from the last or previous corrections.

It is appropriate to point out that means per se for deriving a signal proportional to the setting of a calender or rolling mill screwdown are well known in the art, and in this connection reference is made to U.S. Patent 2,275,509 (Dahlstrom) and U.S. Patent 2,767,603 (Rendel). Dahlstrom has provided a potentiometer which is connected to the screwdown mechanism and driven through the gearing arrangement thereof so to continuously provide a signal indicating the absolute position of the screwdown setting. Randel, as well as Serial No. 261,406, has provided a potentiometer which is selectively clutch-coupled to the screwdown mechanism.

In the control system of Serial No. 261,406, the potentiometer is clutch-coupled to the screwdown mechanism while a correction to the screwdown is in progress. During the controller's inactive period, the potentiometer is reset, through the medium of a second disengageable clutch mechanism, by a rebalancing servomechanism which returns the potentiometer to an initial setting wherein the feedback signal is restored to zero.

These devices were able to obtain good error signal sensitivity per se by being geared up to a high ratio through the train of gears which drives the screwdown. Unfortunately, however, the gears are subject to backlash, which increases with the age of the machine and may vary with the temperature of the gears and the condition of the lubricant therein. A small amount of backlash in certain portions of the gearing is greatly multiplied by the gearing up process, so as to cause a substantially erroneous indication to be obtained from the feedback signal transducer. The effects of the backlash error are particularly severe when, after a correction has been made to the screwdown in one direction, the next correction requires an adjustment in the opposite direction.

It appears that the only way to eliminate the undesirable effects of backlash, particularly in existing machines, is in some manner to apply the feedback signal transducer directly to the load screw itself. However, to my knowledge, this procedure has never been attempted, and the reasons become apparent when its difficulty is considered, as in the following example.

Consider the case of a calender producing sheet plastic of nominally ten mils' thickness. In the ordinary situation, a change of only one or two degrees of screw rotation represents a change of one mil in the thickness of the output plastic strip. Therefore, in order to control the thickness accurately within 1% of this nominal thickness, the feedback controller must have a resolution of less than two-tenths of a degree.

In accordance with a preferred embodiment of this invention, I obtain such resolution by providing a smooth, annual track member, concentric with the screw shaft, and having a much larger diameter than the screw shaft. Cooperating with the annular track member is a further member which is movable along the arc of a circle parallel to the annular track member. One of these members is secured to the screw shaft while the other is adapted for angular movement relative thereto. Cooperating with the latter movable member, I provide means urging the movable member into a fixed reference position relative to some part of the machine which is not angularly displaced by movement of the screw.

In this arrangement, I locate a suitable transducer adapted to generate a feedback signal in response to any angular movement of said movable member relative to said part of the machine. There is also provided a clutch or brake member which is adapted to be energized by a signal from the controller when the same detects an error in the process. Thereupon the brake or clutch member locks said track member and said movable member together, so that the two members rotate with the angular movement of the screw. This movement results in a feedback signal output from the transducer which is proportional to the amount of movement of the screw shaft. The feedback signal is returned to the controller for comparison therein with the error signal indicating the amount of deviation in the thickness of the output strip.

Further, in accordance with the preferred embodiment of my invention, when the screw has moved sufficiently so that the feedback signal becomes equal and opposite to the error signal, the controller is inactivated. The inactivation of the controller causes the brake or clutch member to be disengaged, whereby the moveable member is returned by the urging means aforesaid to its reference position relative to said part of the machine. This causes the transducer output to become zero.

Preferably, the smooth annular track member comprises a circular disk which is clamped around the screw shaft and arranged concentrically with the shaft. Also clamped around the shaft, and preferably secured also to the disk, is a collar having a journal bearing surface machined around the outside thereof. Rotatably mounted on this journal is a control arm which extends radially outward toward the periphery of the disk. The outer end of the radial arm carries a clutch or brake assembly whereby the arm may be clamped to the disk when a signal is received from the controller. The outer end of the arm which carries the clutch or brake assembly is movably supported by means secured to the roll chock which carries the calender or mill roll bearings and which moves up and down with an adjustment of the screw. A suitable transducer, such as a differential transformer, is provided to detect relative movement between the radial arm and the support means.

It is an object of this invention to provide a system whereby automatic discontinuous reset positioning control action may be applied to a rotating member in extremely small angular increments, in a highly accurate manner.

It is also an object to provide a controller whose performance is not subject to deterioration by reason of wear which occurs in the machine adjusting mechanism, whereby the controller is enabled to maintain peak performance for extended periods of time without the necessity for frequent readjustment and maintenance.

It is another object to provide a controller whose performance is insensitive to the effects of backlash in the gears and other mechanical elements of the machine-adjusting mechanism, and which avoids the necessity of providing expensive and complicated auxiliary backlash compensation accessories.

It is still another object to provide a controller of the type described, including a transducer arrangement which can be installed on existing machines such as calenders or rolling mills without any modification or redesign thereof.

Further objects and advantages of the present invention will become apparent in the following detailed description of one preferred embodiment of the invention, taken in conjunction with the appended drawings, in which.

Figure 1:
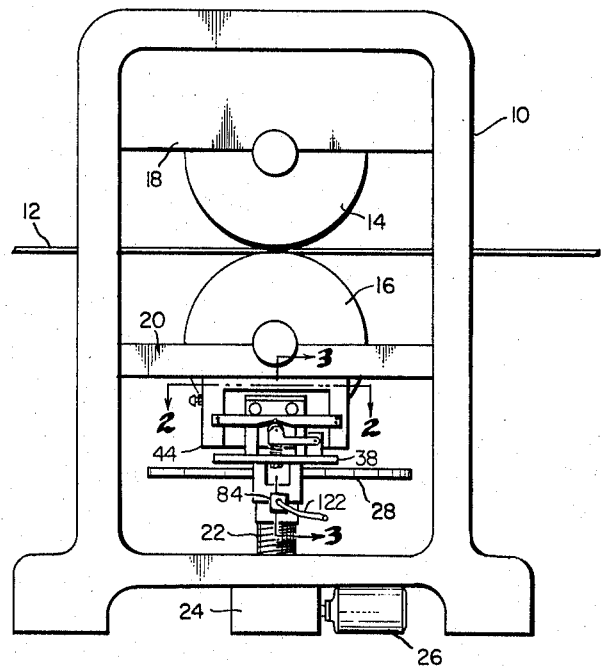
FIG. 1 shows a calender on a rolling mill having installed thereon a screwdown position feedback transducer arrangement in accordance with the invention.

In FIG. 1 there is shown a calender or rolling mill 10 for reducing a sheet or strip 12 passing through the nip of a set of rolls 14 and 16. The upper roll 14 is journaled in a stationary roll bearing chock 18, and the lower roll 16 is journaled in a movable roll bearing chock 20. For the purpose of adjusting the movable chock 20 up and down so as to adjust the spacing between the rolls, there is provided the large load screw 22. The screw 22 is slowly rotatable through the medium of a high ratio gear box 24 by the screwdown motor 26.

With reference to FIGS. 1 to 4, it is seen that a circular disk 28, having a substantially larger diameter than the screw 22, is rigidly secured to the screw for rotation therewith. To facilitate its installation on the screw without dismantling the calender or rolling mill, the disk 28 is split along one diameter 30, FIG. 2. The two halves of the disk are assembled together with suitable dowel pins (not shown) and clamped together by means of screws as at 32, installed in counterbored openings along opposite chords of the disk, prior to the machining of the same in manufacture. Similarly clamped around the shaft of screw 22 is a collar 34 having journal surfaces on the outside thereof. Preferably the collar 34 is also secured to the disk 28 by means of screws as at 36, FIG. 3. A radially-extending control arm 38 is mounted at one end on the journal of collar 34 by means of a capped bearing having a double-faced bronze insert 40 and screws as at 42 for holding the bearing cap in place.

The principal support means for the outer extremity 38a of the control arm 38 is associated with a metal box 44 which is open at the bottom and is secured to the roll chock 20 which moves up and down with the axial movement of the screw 22. The right end 44a of the box 44, as it appears in FIG. 4, which extends in the direction of the terminal end 38a of the control arm 38, has a large, rectangular cut-out portion 46 (see FIG. 4). Bridging this cut-out portion is a track member 48 which is secured to the end of the box at both sides by screws as at 50. The top surface of the track member 48 is horizontal and straight to accommodate a pair of wheels or bearings as at 52. The bearings are mounted on suitable shoulder bolts as at 54, which extend through and secure the bearing assemblies to an upstanding two-legged support member 56 which has the shape of an inverted U in the plan view of FIG. 4, and an inverted L shape in the side view of FIG. 3. This member stands upright on the top surface of the horizontally-extending control arm 38, and each of the two legs is secured to the control arm by means of screws, as at 58, which extend through counterbored openings in the arm 38. Thus it is seen that the radial arm 38 is supported near its outer extremity and is adapted to have a limited amount of radial movement in which the wheels or bearings as at 52 roll back and forth on the smooth, top surface of the track member 48.

The bottom side of the track member 48 is milled out in the shape of a shallow, inverted V, which is adapted to engage the periphery of a rolling wheel or bearing 60. The bearing 60 is mounted in a bifurcated yoke which constitutes the terminal end of a rocker arm 62. The other end of the rocker arm is mounted on a bolt-like pivot 64. The pivot 64 is attached to a block 66 extending upwardly from the control arm 38 and secured thereto by bolts as at 68 passing through the control arm. The free end of the rocker arm 62 which carries the bearing wheel 60 is urged upwardly by a coil spring 70 which is seated in a recessed opening in the control arm 38 and sits on top of a washer 72. The position of the spring seat washer 72 is adjustable up and down by means of a screw stud 74 threaded through the arm 38 to permit an adjustment of the spring pressure with which the bearing wheel 60 is forced against the edges of the V-shaped portion in the track member 48. The spring tension adjustment is maintained by a lock nut 76. This arrangement constitutes a centering device which constantly urges the radial control arm 38 into a predetermined position relative to the box 44 and the roll chock 20 to which the box is secured. It is to be noted that the track member 48 is relieved by having a semicircular notch 78 at the apex of the V to assure positive centering of the control arm even though the surfaces along the two slopes of the V may in due time suffer substantial wear.

Figure 4:
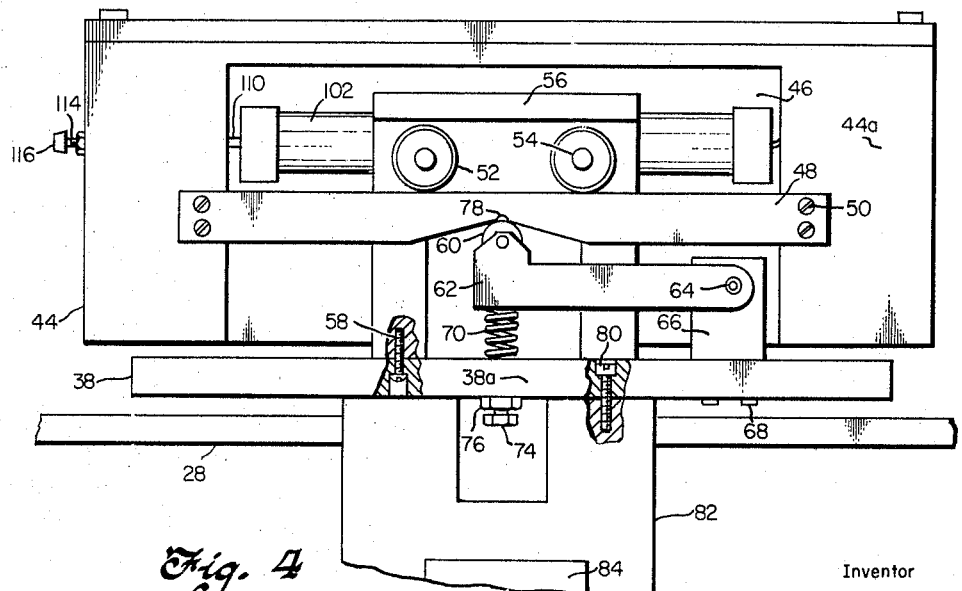
FIG. 4 is an enlargement of a part of FIG. 1.

Extending below the control arm 38, and secured thereto by screws as at 80, FIG. 4, is a clutch or brake actuator mounting bracket 82 which carries on the bottom end thereof a small air cylinder 84 to provide power for operating the brake or clutch assembly. The push rod 86 of the air cylinder is terminated by a hemispherical cap which engages the flanged portion of a rocker arm 88 which is pivotally mounted on the supporting bracket 82. The top side of the rocker arm at the other end thereof has a ball-milled socket in which is fastened a hemispherical, self-aligning friction pad 90 having a flat side adapted to be pressed against the underside of the disk 28 when the push rod 86 is extended. This action clamps control arm 38 and its associated parts to the disk 28, whereby the arm and associated parts will rotate with the disk.

In order to back up the disk on the opposite side of the friction pad 90 and thereby prevent springing the disk, erratic action, or causing damage to other parts of the assembly when the brake or disk member is engaged, there is provided a cylindrical bearing pad 92 which extends through a bored opening in the arm 38. For the purpose of adjusting the bearing pad to ride lightly on the top surface of disk 28, there is provided an adjusting screw 94 which extends through the threaded opening in an inverted cup member 96, which is in turn secured to the control arm by means of screws as at 98. The adjustment is maintained by a lock nut 100.

A second bearing pad identical with pad 92 and its associated mounting arrangement (not shown in the drawings) is provided so that two bearing pad assemblies are mounted symmetrically on opposite sides of the friction pad 90. I preferred to construct the bearing pads as at 92 of graphite-filled Teflon resin plastic, whereas the friction pad 90 is preferably constructed of phenolic plastic.

Figure 2:
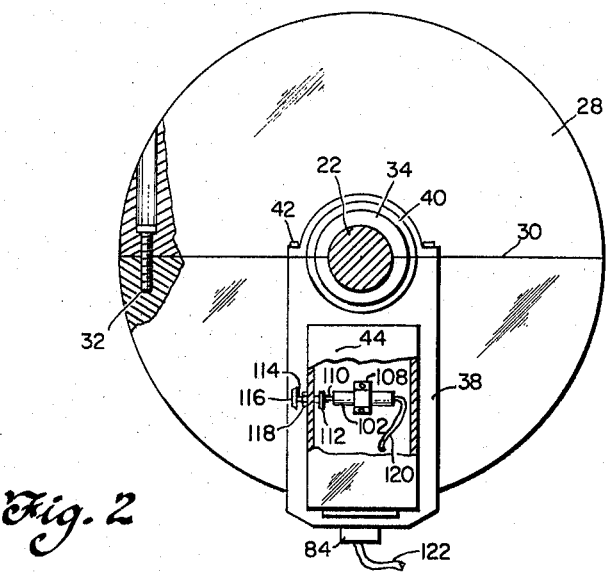
FIG. 2 is a section on the line 2—2 of FIG. 1.
Figure 3:
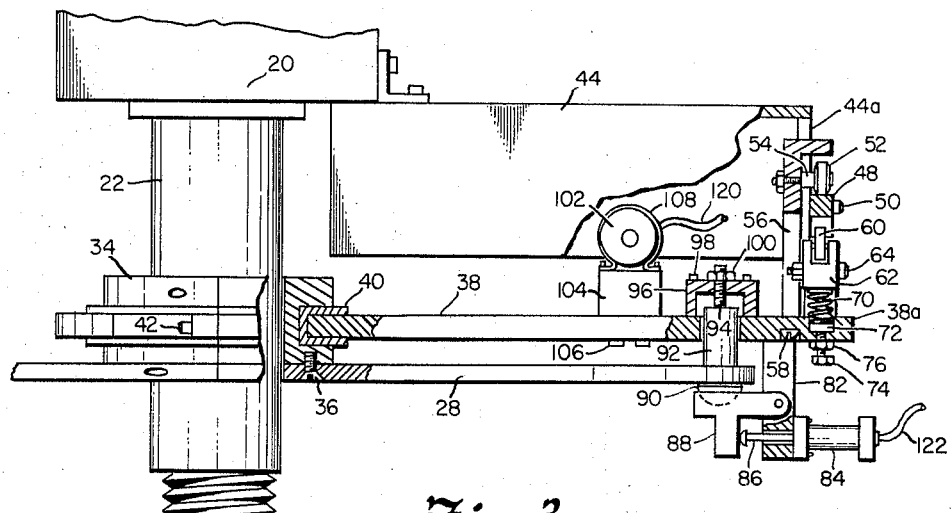
FIG. 3 is a section on the line 3—3 of FIG. 1.

As a transducer for detecting relative movement between the control arm 38 and the box member 44, which is rigidly secured to the roll chock 20, I provide a differential transformer 102. The transformer 102 sits on top of a mounting block 104 which is secured to the control arm 38 by screws as at 106. The transformer is in turn secured to block 104 by means of a clamp 108. This assembly extends upwardly from the control arm 38 and into box 44 which is open at the bottom, as aforesaid. The differential transformer is a conventional movable core device, whose core (not shown) is movable by means of a plunger or operating rod 110, which extends to the left end of the transformer as seen in FIG. 2 and FIG. 4. The operating rod 110 and the internal movable core of the transformer are urged to the left by an internal spring (not shown) which is part of the transformer assembly. The spring presses the operating rod or plunger 110 into engagement with a flange 112 mounted on the end of an adjusting screw 114, which is threaded through the side of the box 44 and terminates in a small adjusting knob 116 on the opposite or outer end of the screw 114.

The differential transformer must be energized by a suitable alternating voltage source located externally of the assembly. Likewise a signal from the sensing or secondary windings of the transformer must be led to the controller through suitable leads. Accordingly, wire leads to the transformer are indicated as being connected to the transformer through a suitable multiconductor cable 120.

An initial electrical adjustment to the differential transformer is made when air pressure to the cylinder 84, which is on occasion admitted through an air hose 122 connected to the cylinder, is removed. With air pressure removed from the actuating cylinder 84, a spring (not shown) within the cylinder returns the piston and its associated push rod to the retracted position, thus relieving the clamping pressure of the friction pad 90 from the disk 28. Control arm 38 is then free to move relative to the disk. The pressure of roller bearing 60 against one of the sloping sides of the V-notch in the track member 48 now produces rotary movement of the arm 38 around its journal collar 34 on screw shaft 22, until the roller 60 is centered in the V-notch on track member 48. Under this condition there should be no signal output from the differential transformer 102. The two signal windings on this transformer are connected in series opposition and the difference between the two voltages will be zero when the movable core of the transformer is located in its null position. This null position is obtained by turning the adjusting screw 114 by means of its operating knob 116 until the voltage output from the differential transformer is zero.

From the foregoing description it will become apparent that my invention is characterized by the inclusion, in various control system arrangements, of a transducer arrangement including three members, one of said members comprising an annular track, as is exemplified by the peripheral portion of the control disk 28, having a common axis with a shaft, such as a screw shaft 22, and a substantially larger diameter than the shaft. One of the members is exemplified by box 44 and the parts secured thereto.

A first one of the three members, as exemplified by the disk 28, is secured to the shaft for positive rotation therewith. A second one of the three members, as is exemplified by the box 44 and the parts secured thereto, is anchored in a stationary position with respect to angular movement of the shaft, although, as has been stated hereinabove, this member is allowed to follow the axial movement of the shaft as the box member moves up and down with the roll chock 20. The third one of the three members, as exemplified by the control arm 38, is mounted for floating movement with respect to the first and second members, that is, by being journaled at one end on the collar 34 and also being arcuately movable horizontally at the other end as permitted by the rollers 52 and 60 bearing against the track member 48.

The operation of the roll position sensing apparatus illustrated in FIGURES 1–4 may be described as follows: Whenever the screw-down motor 26 is called upon to make a roll adjustment, the load screw 22 rotates in one direction or the other. For simplicity, an adjustment moving the rolls 14 and 16 together will be described. Since the load screw is threaded in the base of the mill 10, and it freely rotates, in a conventional manner, in the underside of the roll chock 20, a rotation of the screw 22 causes the roll chock 20 to be carried upwardly. As soon as the screw 22 starts to rotate, the control arm 38 is clamped to the disk 28 so that the control arm is carried with the disk and is therefore angularly displaced with the screw 22. The box member 44 moves upward with the roll chock 20 only a very short distance, depending on the pitch of the load screw. It is apparent that the disk 28 and control arm 38 both move upwardly through the same distance. As best seen in FIG. 4, the control arm 38 moves laterally, carrying the transformer housing 102 toward one side of the box member 44. The rod 110 connected to the transformer core is moved by the relative motion between the control arm 38 and the box member 44 to provide an electrical signal indicative of the distance moved. The displacement of the transformer core and therefore the generated signal will be proportional to the length of arc described by the end of the control arm 38. Arc length is in turn proportional to the angle through which the screw 22 is rotated.

Since only a small rotational displacement of the screw is permitted per adjustment, the centering roller 60 will ride partially up on one incline or the other of track member 48 and compress the spring 70. When the motor 26 is de-energized, the clamping solenoid (FIG. 3) unclamps the control arm 38 from the disk 28. The control arm, being free to rotate about the screw 22, is moved back in the direction from which it came by the spring 70 which urges the roller 60 toward the junction of the inclined track surfaces. The roller arm 62 transmits the lateral motion to the control arm 38 until it is repositioned centrally beneath the box member 44.

The transducer arrangement of the invention is further characterized by the selectively engageable and disengageable means, as exemplified by the air cylinder actuated clamping device, for interlocking the annular track member with one of the other members when the interlocking means is engaged. The arrangement also includes means, as exemplified by the V-notch, the roller follower arrangement and its associated spring means, for locating the floating third member in a reference position with respect to one of the other members as exemplified by box 44 when the interlocking means is disengaged. The arrangement further includes a transducer, as exemplified by the differential transformer 102, for providing a feedback signal indicating the direction and amount of any departure of the third member from the reference position.

While I believe that I have disclosed the best arrangement of the members, and have successfully constructed and operated a device as shown and described, it appears that various rearrangements and transpositions of the members set forth would be possible while still obtaining the desired results, even though such construction might or might not be as economical or satisfactory.

Figure 5:
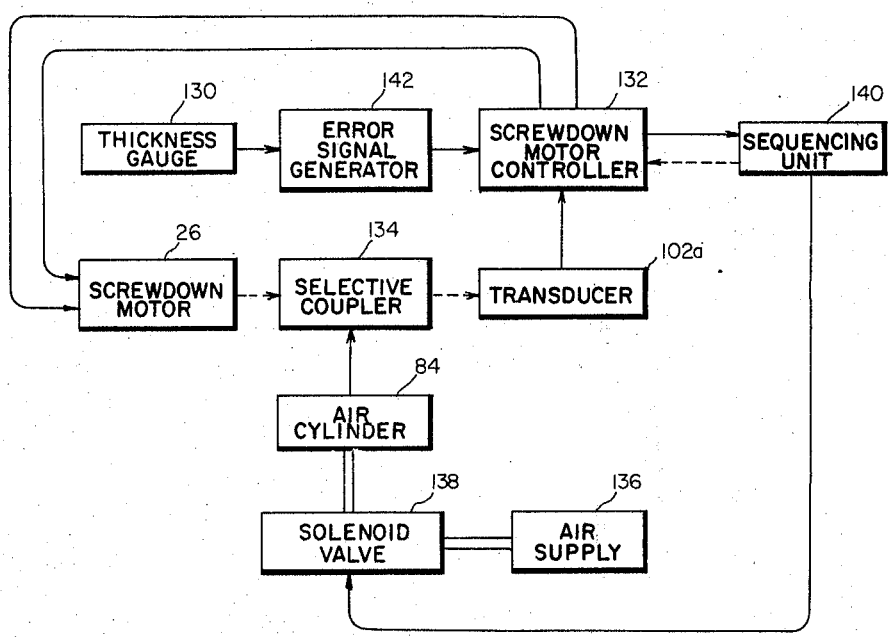
FIG. 5 is a block diagram of an apparatus for controlling the thickness of strip or sheet material issuing from a calender or rolling mill in accordance with a preferred embodiment of the invention.

Reference can now be made to FIG. 5 which shows the elements of a typical feedback control installation embodying the invention. It is the purpose of this control system to detect an error in the thickness of the output strip 12 (FIG. 1), as measured by a suitable thickness gauge 130, and to correctively alter the spacing between rolls 14 and 16 by operation of the screwdown motor 26 in the proper direction and in the proper amount.

In the block diagram it is indicated that a transducer 102a, such as the differential transformer 102, is installed in the control system between the screwdown motor 26 and a screwdown motor controller 132. It is further indicated that the transducer is acted on by operation of the screwdown motor through what is labeled a "selective coupler" which generally represents the mechanism illustrated in FIGS. 2 to 4. The selective coupler is actuated by the air cylinder 84, which is connected to a suitable air supply 136 through a solenoid valve 138. Valve 138 selectively applies air pressure from the supply to the cylinder, and is alternately adapted to exhaust the pressure from the cylinder when the valve is in its alternate position. The solenoid valve is adapted to be energized by an electrical signal from a sequencing unit 140 which is provided in one form or another in discontinuous controllers of the type described. For specific details of construction and the general mode of operation of such controllers, reference can be made to the copending application of Palmer et al. cited hereinabove.

The operation of the control system of FIG. 5 may now be described briefly as follows: the screwdown motor controller 132 is responsive to the error signal from an error signal generator 142 which is coupled to the thickness gauge 130 measuring the thickness of the strip 12 (FIG. 1) at the output of the mill or calender. The error signal output of generator 142 is proportional in phase and magnitude to the deviation in the thickness of strip 12 which is to be corrected by a movement of the screwdown proportional to said thickness deviation. To this end the screwdown motor controller 132 is activated at suitable times by the sequencing unit 140. At such a time the solenoid valve 138 is energized, either directly, as shown, by a signal from the sequencing unit 140, or alternately in other known arrangements through timing circuits or other arrangements provided in the programming mechanism of the screwdown controller 132 per se. When the controller 132 perceives an error signal from generator 142 which is not within allowable limits, appropriate relays in the controller are operated to energize the screwdown motor 26 to rotate in the proper direction to either increase or decrease the spacing between rolls 14 and 16 and thereby correct the error in the thickness of the strip 12. Meanwhile, the selective coupler 134 has been operated by the air cylinder; specifically (FIG. 3), the control arm 38 will have been clamped to disk 28 by means of the clamping arrangement provided. The transducer 102a such as transformer 102 is responsive to the resulting displacement of the control arm 38 with respect to box 44, and the transformer will generate a signal having a phase indicating the direction of the displacement and an amplitude indicating the amount of movement of the screw which has been effected by this particular operation of the screwdown motor 26. The controller 132, which is responsive to the difference between this feedback signal and the error signal from generator 142, will be inactivated when the error and feedback signals have been equalized. The result is that in a given operation of the screwdown motor the amount of correction applied to the screwdown, and the resulting correction to the thickness of the output strip 12, will be very accurately proportional to the value of the error signal. At the end of a correction cycle the sequencing unit (either per se or through the operation of programming circuits within the controller 132) will disconnect the signal which has been energizing the solenoid valve 138, allowing the air to be exhausted from the air cylinder 84. At this time the control arm 38 will be unclamped from the disk 28, whereupon the control arm 38 will be returned to its reference position wherein the spring-operated roller 60 is in the center of the V-notch in the track member 78. The return of the control arm to the index position causes the movable core of the differential transformer to again assume its null position whereby its signal output is returned to zero. At this time the control system is ready for another cycle of operation repeating the foregoing sequence of events.

While the invention is herein shown and described as being embodied in specific apparatus, it is to be understood that such showing and description is illustrative only and not restrictive, since many modifications, transportation of members, and substitution of well-known equivalents for the elements of the combination, can obviously be made without departing from the spirit and scope of the invention as is set forth in the appended claims.

What is claimed is:

1. In a control system of the discontinuous reset type for incrementally repositioning a rotary shaft in accordance with the value of an error signal, a feedback signal transducer arrangement including three members, a first one of said members extending transversely of said shaft, said first one of said members being secured to said shaft for positive rotation therewith, a second one of said members being anchored in a stationary position with respect to angular movement of said shaft, and a third one of said members being mounted on said shaft extending transversely thereof for floating movement about said shaft axis relative to said first and second members; selectively engageable and disengageable means for interlocking the extended end of said first one of said members with the extended end of said third one of said members when said interlocking means is engaged; means for locating said floating third member in a reference position with respect to said second one of said members when said interlocking means is disengaged; and a transducer responsive to movement of said third member away from said reference position for providing a feedback signal indicating the direction and amount of departure of said third member from said reference position.

2. In a control system of the discontinuous reset type for incrementally repositioning a rotary shaft in accordance with the value of an error signal, a first member extending transversely of said shaft, a second member, means securing said first member to said shaft for positive rotation therewith, a third member adapted for movement with respect to said first and second members, selectively engageable and disengageable means for interlocking the extended end of said first member and said third member when said interlocking means is engaged, anchoring means mounting said second member in a stationary position with respect to the angular movement of said shaft, means for locating said moving third member in a reference position relative to said anchoring means when said interlocking means is disengaged, and a transducer responsive to relative movement between said anchoring means with said moving third member for providing a feed-back signal proportional to a displacement of said moving third member from said reference position.

3. In a control system for incrementally repositioning a machine element which is linearly movable with the axial travel of a screw shaft but secured against rotation therewith, a track member secured to said shaft for rotation around a common axis with said shaft extending transversely thereof, a second member mounted for floating movement with respect to said track member and said machine element, selectively engageable and disengageable means for interlocking said track member and said second member when said interlocking means is engaged, means for locating said second member in an angular reference position with respect to said machine element when said interlocking means is disengaged, and a transducer responsive to movement of said second member away from said reference position for providing a feed-back signal indicating the direction and amount of departure of said second member from said reference position.

4. In a control system for a calender or strip rolling mill of the type having a screwdown mechanism including a load screw shaft for adjusting and maintaining the spacing between the work rolls of the mill, wherein said spacing is determined by the angular position of said shaft and is adjustable by motor means for actuating said screwdown, and wherein in response to the indication provided by a thickness gauge for the strip at the output of the mill a generated error signal representing the thickness deviation in said strip is fed back to control the operation of said motor means, the improvement comprising: means responsive to said error signal for energizing said motor means in a direction to correct said deviation, a feedback signal transducer arrangement including three members, a first one of said members comprising an annular track having a common axis with said screw shaft and a substantially larger diameter, said first one of said members being secured to said screw shaft for positive rotation therewith, said second one of said members being anchored in a stationary position with respect to angular movement of said screw shaft and a third one of said members being mounted for floating movement with respect to said first and second members; selectively engageable and disengageable means for interlocking said annular track member with said third one of said members when said interlocking means is engaged; means for locating said floating third member in a reference position with respect to said second one of said members when said interlocking means is disengaged, a transducer responsive to movement of said third member away from said reference position for providing a feedback signal indicating the direction and amount of departure of said third member from said reference position, means for engaging said interlocking means when said motor means is energized, means responsive to both said error signal and said feedback signal for deenergizing said motor means when said feedback signal bears a predetermined relationship to said error signal, and means operative while said motor means is deenergized for disengaging said interlocking means.

5. In a control system for a calender or strip rolling mill of the type hraving a screwdown mechanism including a load screw shaft for adjusting and maintaining the spacing between the work rolls of the mill, of the type said spacing is determined by the angular position of said shaft and is adjustable by motor means for actuating said screwdown, and wherein in response to the indication provided by a thickness gauge for the strip at the output of the mill a generated error signal representing the thickness deviation in said strip is fed back to control the operation of said motor means, the improvement comprising: means responsive to said error signal for energizing said motor means in a direction to corect said deviation, a feedback signal transducer including three members, or first member comprising an annular track having a common axis with said screw shaft and a substantially larger diameter, said first member being secured to said screw shaft for positive rotation therewith, a second one of said members being anchored in a stationary position with respect to angular movement of said screw shaft and a third one of said members being mounted for floating movement with respect to said first and second members; selectively engageable and disengageable means for interlocking said annular track member with one of the other of said members when said interlocking means is engaged; means for locating said floating third member in a reference position with repsect to said second member when said interlocking means is disengaged, a transducer responsive to movement of said third member away from said reference position for providing a feedback signal indicating the direction and amount of departure of said third member from said reference position, means for engaging said interlocking means when said motor means is energized, means responsive to both said error signal and said feedback signal for deenergizing said motor means when said feedback signal bears a predetermined relationship to said error signal, means maintaining said motor means deenergized at least during the transportation lag time required for said strip to travel from said mill to said gauge, and means operative while said motor means is deenergized for disengaging said interlocking means.

6. In a control system for a calender or strip rolling mill of the type having a screwdown mechanism including a load screw shaft and a roll chock linearly movable with said shaft but secured against rotation therewith for adjusting the spacing between the work rolls of the mill, wherein said spacing is determined by the angular position of said shaft and is adjustable by motor means for actuating said screwdown, and wherein in response to the indication provided by a thickness gauge for the strip at the output of the mill a generated error signal representing the thickness deviation in said strip is fed back to control the operation of said motor means, the improvement comprising: means responsive to said error signal for energizing said motor means in a direction to correct said deviation, a control disc having a substantially larger diameter than said shaft secured thereto for rotation around the axis of said shaft, a control arm having one end journaled around said shaft and the other end extending radially outward toward the periphery of said disc, anchor means secured to said roll chock and having bearing means for supporting the outer end of said control arm for limited angular movement around said screw shaft, a clutch member carried by said control arm for clamping said control arm to said disc when said clutch is engaged, resilient spring means urging said outer end of said control arm into an angular reference position with respect to said anchor means when said clutch is disengaged, a transducer responsive to movement of said control arm away from said reference position for providing a feedback signal indicating the direction and amount of departure of said control arm from said reference position, means for engaging said clutch when said motor means is energized, means responsive to both said error signal and said feedback signal for deenergizing said motor means when said feedback signal bears a predetermined relationship to said error signal, means maintaining said motor means deenergized at least during the transportation lag time required for said strip to travel from said mill to said gauge, and means operative while said motor means is deenergized for disengaging said clutch.

7. In a control system for incrementally repositioning a rotary shaft in accordance with the value of an error signal, apparatus for transducing the incremental repositioning of said shaft comprising:
    a disk member rotatable with said shaft and extending transversely thereof,
    a rigid arm separately rotatable about said shaft and extending transversely of the longitudinal axis thereof,
    means for releasably clamping the outer end of said rotatable arm to the outer end of said disk member, the extended end of said arm moving along an arc in accordance with the rotational repositioning of said shaft,
    means communicating with said extended end of said arm to provide a signal proportional to the arcuate movement of said extended end of said arm, and
    means for automatically returning said arm along said arc after said arm has stopped.

8. In a control system for incrementally repositioning a rotary shaft in accordance with the value of an error signal, apparatus for transducing the incremental repositioning of said shaft comprising:
    a member rotatable with said shaft and extending transversely thereof,
    a rigid arm separately rotatable about said shaft and extending transversely of the longitudinal axis thereof,
    means for clamping said rotatable arm to said member, the extended end of said arm moving along an arc in accordance with the rotational repositioning of said shaft, means communicating with said extended end of said arm to provide a signal proportional to the movement of said extended end of said arm along said arc, and means for resetting said signal providing means to a reference position after each incremental repositioning of said shaft.

9. In a control system for incrementally repositioning a rotary shaft in accordance with the value of an error signal, apparatus for transducing the incremental rotation of said shaft, comprising:

a disk member extending transversely of said shaft and rotating in unison therewith, a frame member fixed with respect to the incremental rotation of said shaft, a control arm freely mounted for rotation about said shaft, means for locking said rotatable disk member and said control arm together whenever said shaft is rotated to angularly displace said control arm from a reference position with respect to said frame member, means responsive to said angular displacement of said control arm with respect to said frame member for providing a signal in accordance therewith, means for unlocking said control arm and said rigid member after said shaft rotation has stopped, and means for returning said control arm to said reference position after each incremental shaft rotation.

10. The control system as set forth in claim 9 in which said signal providing means comprises:

a differential transformer mounted on one of the other of said control arm and said frame member and having a movable core engaging the other of said control arm and said frame member.

11. The apparatus as set forth in claim 8, wherein said resetting means comprises:

a reference member fixedly mounted with respect to said extended end of said arm and having a V-shaped cam surface, a cam follower assembly including a roller for following said V-shaped cam surface,
a follower arm for carrying said roller,
means for pivotally mounting said follower arm on said extended rigid arm, and
resilient spring means for continuously biasing said follower arm toward said reference member to urge said roller toward the center of said V-shaped cam surface.

References Cited by the Examiner

UNITED STATES PATENTS

| 2,003,129 | 5/1935 | Bedell | 72—21 |
| 2,072,831 | 3/1937 | Solenberger | 33—182 |
| 2,616,185 | 11/1952 | White | 33—182 |
| 2,659,154 | 11/1953 | Rendel | 88—56.1 |

CHARLES W. LANHAM, *Primary Examiner.*

WILLIAM J. STEPHENSON, *Examiner.*